United States Patent [19]

Shropshire et al.

[11] 4,286,027

[45] Aug. 25, 1981

[54] SHUNT CURRENT PROTECTION FOR CIRCULATING ELECTROLYTE IN MONOPOLAR BATTERY SYSTEMS (BAT-81)

[75] Inventors: Joseph A. Shropshire; Patrick G. Grimes, both of Westfield, N.J.

[73] Assignee: Exxon Research & Engineering Co., Florham Park, N.J.

[21] Appl. No.: 144,679

[22] Filed: Apr. 28, 1980

[51] Int. Cl.³ .......................................... H01M 8/24
[52] U.S. Cl. ...................................... 429/18; 429/27; 429/70; 429/72
[58] Field of Search .................... 429/70, 18, 27, 206, 429/72, 82

[56] References Cited

U.S. PATENT DOCUMENTS

| | | | |
|---|---|---|---|
| 4,048,045 | 9/1977 | Eng et al. | 204/263 |
| 4,188,622 | 2/1980 | Klooteoyk | 429/70 X |
| 4,197,169 | 4/1980 | Zohn et al. | 429/18 X |
| 4,200,685 | 4/1980 | Klooteoyk et al. | 429/70 |

OTHER PUBLICATIONS

"Prevention of Electrolytic Corrosion of an Aqueous Alkali Chloride Electrolysis Cell", M. Tadoyuki et al. Chem. Abs. 89, 170987g, vol. 89 (1978).

Primary Examiner—Charles F. LeFevour
Attorney, Agent, or Firm—Robert S. Salzman

[57] ABSTRACT

Monopolar battery performance may be enhanced by circulating the electrolyte. A circulating electrolyte configuration for this type of system, however, gives rise to undesirable shunt current effects when used in series arrays. A protective current is applied to reduce or eliminate the shunt currents. The application of the protective current in aqueous monopolar battery systems will result in a REDOX reaction couple, wherein water is electrically consumed at the protective current anode and electrically replaced at the protective current cathode.

14 Claims, 2 Drawing Figures

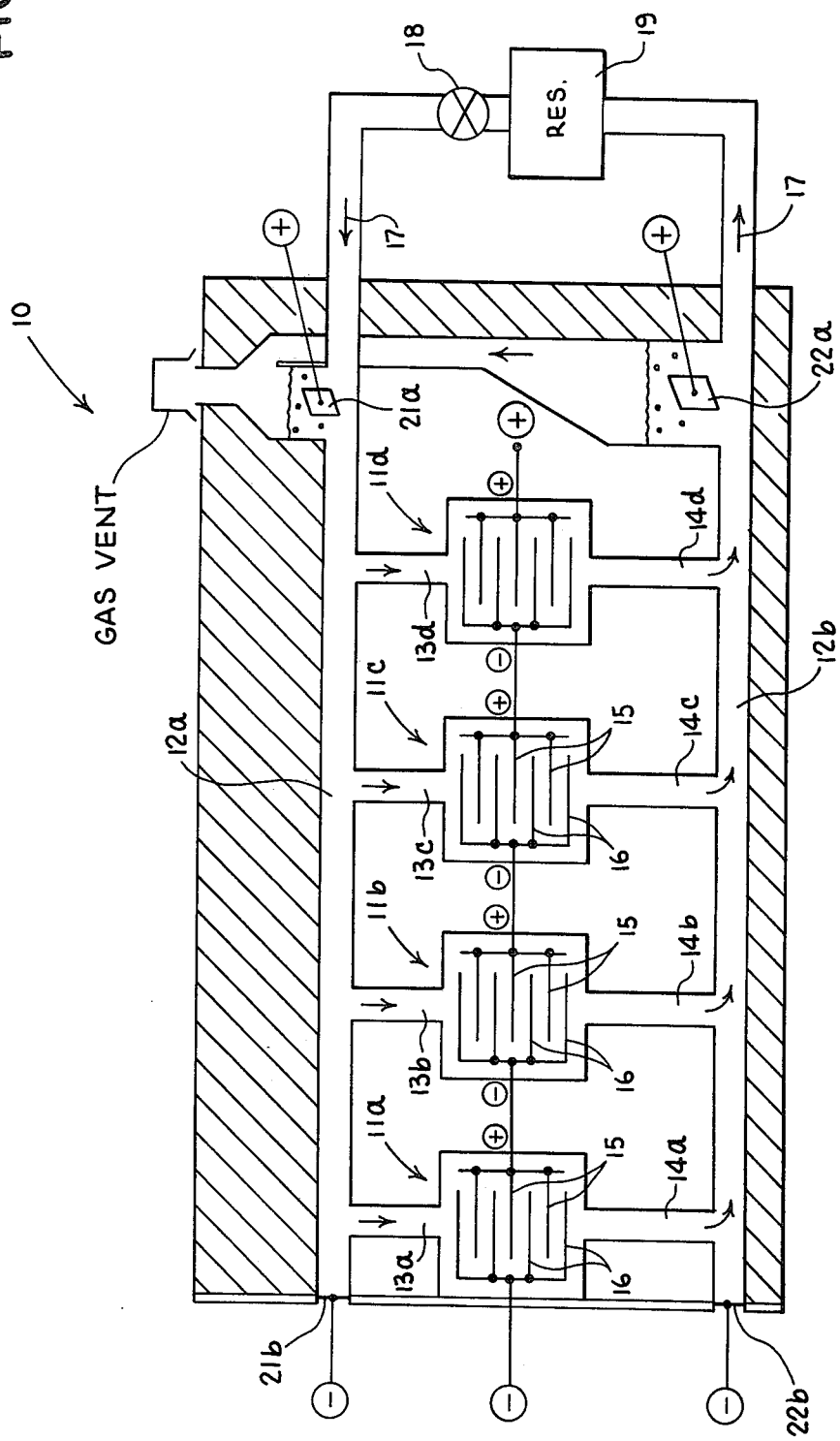

SHUNT CURRENT PROTECTION FOR CIRCULATING ELECTROLYTE IN MONOPOLAR BATTERY SYSTEMS (BAT-81)

RELATED PATENTS AND PATENT APPLICATIONS

The subject invention is related to U.S. Pat. No. 4,197,169, entitled: "SHUNT CURRENT ELIMINATION AND DEVICE", issued Apr. 8, 1980, and to copending U.S. Patent Applications, Ser. Nos. 97,194; 122,193; and 122,706, respectively filed on Nov. 26, 1979; Feb. 19, 1980 and Feb. 19, 1980; all are assigned to a common assignee.

The teachings of these inventions are meant to be incorporated herein by way of reference.

FIELD OF THE INVENTION

This invention pertains to monopolar batteries, and more particularly to monopolar batteries in series-connected array having generally circulating electrolyte with shunt current protection.

BACKGROUND OF THE INVENTION

Efficiency of monopolar batteries, such as those of the common lead/acid type, can be improved by circulating the electrolyte through the electrically series-connected cells. Such circulation improves mass transfer limitations, facilitates heat removal, decreases IR losses, provides homogeneity of electrolyte, etc. The circulation of electrolyte in these electrically series-connected cells can be accomplished by providing the batteries with common manifolds and individual feeder channels to the cells. The electrolyte is pumped through these manifolds and feeder channels and flows through the plates in each cell of the battery.

The use of this circulating electrolyte design for monopolar cells in electrically series-connected array can create commonly shared electrolyte pathways around the cells. Such pathways give rise to shunt currents, which are detrimental to the operation of the battery. A more detailed discussion of the deleterious effects of shunt currents and their elimination can be found in a recent U.S. patent to M. Zahn, et al., entitled: "SHUNT CURRENT ELIMINATION AND DEVICE", U.S. Pat. No. 4,197,169, issued Apr. 8, 1980 and assigned to a common assignee.

The present invention is concerned with obtaining the advantages afforded by circulating electrolyte for various monopolar battery systems, without suffering the harmful effects arising from shunt currents.

SUMMARY OF THE INVENTION

The invention relates to monopolar aqueous battery systems. These systems comprise a plurality of cells which are electrically connected at least in part in series and connected hydraulically at least in part in parallel. A hydraulic pathway allows for the circulation of common electrolyte through at least two of the cells. This hydraulic pathway creates an electrical electrolytic conductive bypass path through shared electrolyte around the cells, whereby undesirable shunt currents can arise in the shared electrolyte.

Means are provided which define a REDOX reaction, wherein water is electrically consumed and replaced, including means for applying a protective current through at least a part of the conductive bypass path through the shared electrolyte. The protective current is passed in a direction which is the same as the shunt currents through the shared electrolyte, and with a magnitude which effectively at least reduces the shunt currents.

It is an object of the invention to provide an improved monopolar aqueous battery system;

It is another object of the invention to provide a monopolar aqueous battery system having the benefits of circulating electrolyte substantially without the detriments of shunt current effects.

These and other objects of this invention will be better understood and will become more apparent with reference to the following detailed discussion considered in conjuction with the accompanying drawings.

BRIEF DESCRIPTION OF THE DRAWINGS

FIG. 2 is a schematic view of an alternate embodiment to the invention shown in FIG. 1.

DETAILED DESCRIPTION OF THE INVENTION

Figure 1:
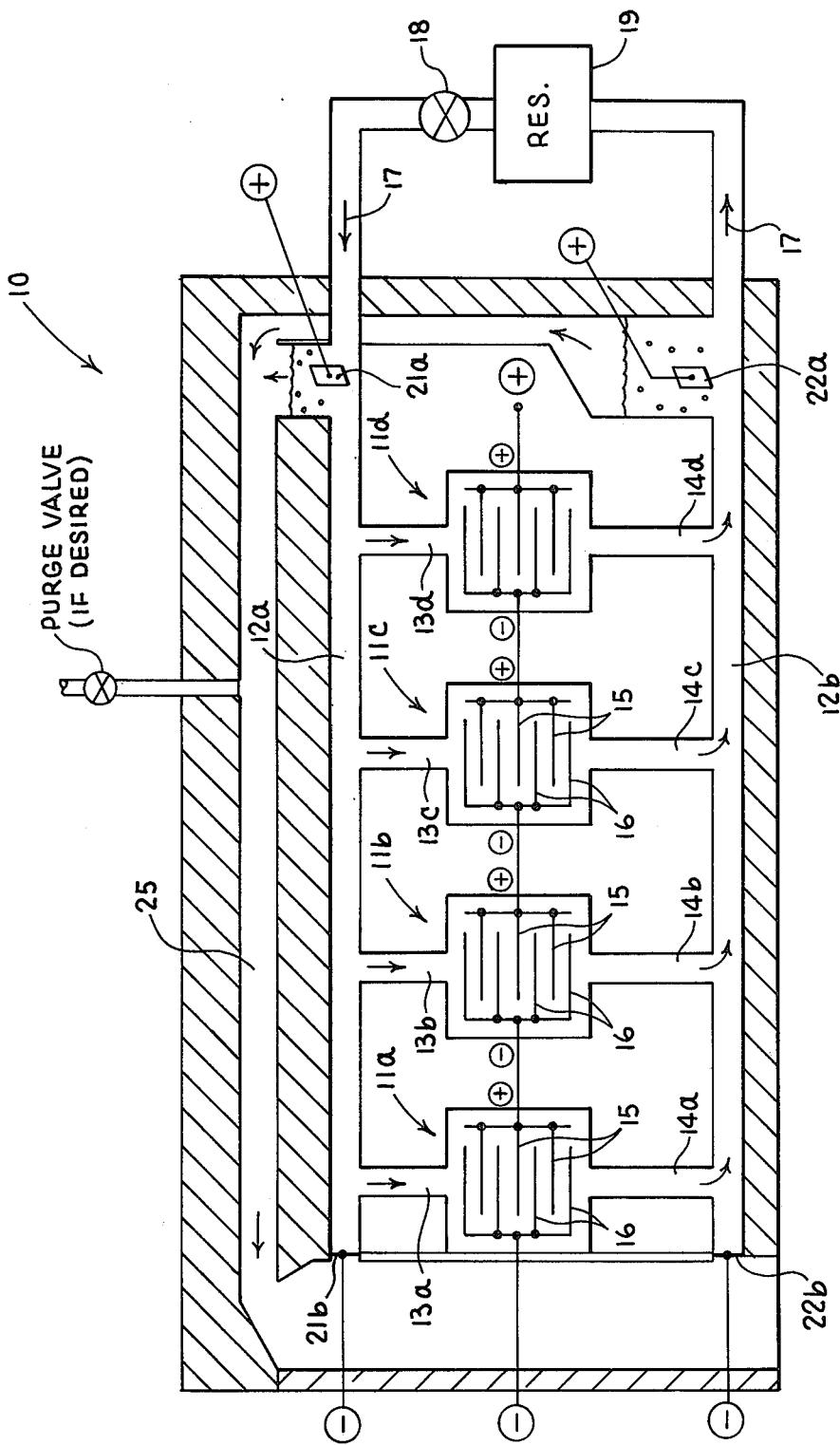
FIG. 1 is a schematic view of a monopolar battery system of this invention.

Generally speaking, the invention features a monopolar aqueous battery system having circulating electrolyte and shunt current protection.

As used herein, the term "common electrolyte" shall mean an electrolyte which is employed in and distributed to two or more cells, at least part of the electrolyte comprising a physical continuum. In a circulating electrolyte system using one or more manifolds, the physical continuum includes the electrolyte contained within the manifolds, the branch channels and the cells.

As used herein, the term "shared electrolyte" shall mean that portion of the electrolyte which is located in an area of commonality to the electrolyte contained in individual components. Thus, in a circulating electrolyte system using one or more manifolds, the electrolyte contained within reservoir(s) and manifold(s) is the shared electrolyte, and electrolyte contained in branch channels, cells and other individual components is not shared electrolyte.

As used herein, the expression "minimization of shunt currents" shall be used to mean reduction of shunt currents or elimination of shunt currents.

Referring now to FIG. 1, a monopolar aqueous battery system 10 is shown. The system 10 comprises a plurality of cells 11a; 11b; 11c; 11d; connected eletrically in series. These cells are hydraulically connected in parallel via common electrolyte-feeder and return manifolds 12a and 12b, respectively, individual electrolyte-feeder channels 13a; 13b; 13c; 13d; and individual electrolyte-return channels 14a; 14b; 14c; 14d; respectively.

The cells 11a; 11b; 11c; etc., respectively, comprise respective anodic and cathodic plates 15 and 16, through which the electrolyte is caused to flow, as the electrolyte is circulated through the manifolds and channels as shown by arrows 17.

Common electrolyte is circulated via pump 18 from reservoir 19 through manifolds 12a and 12b which form a closed-loop hydraulic pathway with the reservoir.

Shunt currents will arise in such a system 10, due to the electrical electrolytic conductive bypass path created around each cell 11a; 11b; 11c; etc., through shared electrolyte in the manifolds. As taught in the prior U.S. Pat. No. 4,197,169, issued Apr. 8, 1980, such shunt currents can be effectively minimized, reduced, or eliminated by application of a protective current. The protective current is applied through the shared electrolyte in a direction which is the same as the shunt currents through the shared electrolyte and with sufficient magnitude to effectively at least reduce the shunt currents. The protective current is respectively applied to the electrolyte in respective manifolds 12a and 12b via electrode pairs 21a; 21b; 22a; and 22b; respectively. Inserting the protective current requires two electrochemical reaction electrodes for REDOX reactions.

Oxidization/reduction (REDOX) reactions at these electrodes convert the electronic current to an ionic current. Thus, at least in principle, any REDOX reactions may be used. For example, they could be the same as the reactions at the electrodes of the electrochemical device. Alternatively, other reactions may be used which are compatible chemically and electrically with the electrochemical device.

For example, $O_2$ could be cathodically reduced at one end of the electrochemical device and $O_2$ could be evolved at the other end. The two reactions in acidic solution would be:

$$O_2 + 4H^+ + 4e \rightarrow 2H_2O$$

$$2H_2O \rightarrow O_2 + 4H^+ + 4e$$

The $O_2$ gas produced could be piped back to the anodic electrode, via gas transfer tube 25, as shown, if a sealed system is desirable.

In another case, $H_2$ could be oxidized at the anode and reduced at the cathode, for example:

$$H_2 + 2OH^- \longrightarrow 2H_2O + 2e^-$$

$$2H_2O \xrightarrow{+2e} H_2 + 2OH^-$$

The choice of the REDOX reactions is dependent on the particular system being protected and could follow standard electrochemistry, as a matter of choice.

In aqueous systems, which is the subject of the present invention, the reactions can involve either water component, i.e., either $H_2$ or $O_2$. For practical purposes, however, it is more desirable to generate and consume $O_2$, because of the explosive nature of hydrogen gas.

A typical aqueous acid system of this invention, wherein water is electrically consumed and generated is a $Pb/H^+$ (lead/acid) battery.

Typical aqueous alkaline systems of this invention, wherein water is electrically consumed and generated are Zn/NiOOH (zinc/nickel) and Fe/NiOOH (iron/nickel) batteries.

Other systems which can utilize the invention are the metal/air systems such as Zn/air and Fe/air.

The invention is not limited to any particular chemistry, and the above-mentioned systems are presented as exemplary teachings only.

The benefits to be derived by the circulating electrolyte in the monopolar systems of this invention are: (a) improved heat removal; (b) overcoming mass transfer limitations; (c) reducing IR losses; (d) improving the homogeneity of the electrolyte; etc.

However, the configuration or design needed to effect circulation of the electrolyte in this system will give rise to shunt currents even when the electrolyte is not circulating.

The electrolyte composition in these systems remains constant, since the water which is electrically consumed at anodes 21a and 22a, respectively, is replaced at cathodes 21b and 22b, respectively.

The system shown in FIG. 1, depicts the generated oxygen occurring at anodes 21a and 22a being piped to the cathodes 21b and 22b, respectively, via a gas transfer tube(s) 25. The electrodes can be annular in design (but not necessarily so), as taught and described in U.S. application, Ser. No. 122,706; filed Feb. 19, 1980.

The oxygen generated at the anodes in the system of FIG. 1 may also be vented to the atmosphere, and the oxygen consumed at the cathodes can be obtained from the surrounding air, as shown in an alternate embodiment in FIG. 2. Like or similar components in FIG. 2 have been given the same designations as in FIG. 1, for the sake of descriptive brevity. Many other electrode and battery designs compatible with the battery chemistry and useful with this invention will naturally occur to the skilled practitioner of this art. The invention is deemed not to be limited to any particular battery design or chemistry as it relates to monopolar aqueous electrically series-connected battery systems having generally circulating electrolyte with shunt current protection.

Having thus described the invention, what is desired to be protected by Letters Patent is presented by the following appended claims.

What is claimed is:

1. A monopolar aqueous battery system, comprising:
   (a) a plurality of cells electrically connected at least in part in series and connected hydraulically at least in part in parallel;
   (b) means defining a hydraulic pathway for an aqueous electrolyte common to at least two of said cells, wherein an electrical electrolytic conductive bypass path is formed through shared electrolyte around said cells, whereby undesirable shunt currents can arise in said shared aqueous electrolyte;
   (c) means for circulating said aqueous electrolyte between said cells; and
   (d) means defining a REDOX reaction for said aqueous electrolyte wherein water is electrically consumed and replaced, whereby the composition of said aqueous electrolyte remains substantially constant, including means for applying a protective current through at least a part of said conductive bypass path through said shared electrolyte in a direction which is the same as the shunt currents through said shared electrolyte and of a magnitude which effectively at least reduces said shunt currents.

2. The monpolar aqueous battery system of claim 1, wherein said aqueous battery system is an acid system.

3. The monopolar aqueous battery system of claim 1, wherein said aqueous battery system is an alkaline system.

4. The monopolar aqueous battery system of claim 2, wherein the battery system is a lead/acid system.

5. The monopolar aqueous battery system of claim 3, wherein the battery system is a zinc/nickel system.

6. The monopolar aqueous battery system of claim 3, wherein the battery system is an iron/nickel system.

7. The monopolar aqueous battery system of claim 1, wherein said battery system is a metal/air system.

8. The monopolar aqueous battery system of claim 1, wherein said plurality of cells are all electrically connected in series.

9. The monopolar aqueous battery system of claim 1, wherein said plurality of cells are all hydraulically connected in parallel.

10. The monopolar aqeuous battery system of claim 1, wherein said means defining a common hydraulic pathway includes a common manifold, and wherein said means for applying a protective current comprises means for applying said protective current across at least a part of said common manifold.

11. The monopolar aqueous battery system of claim 10, wherein said means for applying a protective current comprises means for applying said protective current substantially across the entire length of said common manifold.

12. The monopolar aqueous battery system of claim 1, wherein said means defining a REDOX reaction is an oxygen generating and consuming reaction couple.

13. The monopolar aqueous battery system of claim 1, wherein said protective current applying means comprises spaced-apart electrodes, and gas transfer means interconnecting said electrodes to provide control of the electrolyte composition.

14. The monopolar aqueous battery system of claim 1, wherein said protective current applying means comprises spaced-apart electrodes, each of which communicates with the atmosphere.

* * * * *